324-77 CROSS REFERENCE SEARCH ROOM

Feb. 19, 1963 G. J. FOUNDAS 3,078,426
MAGNETOSTRICTIVE FILTER APPARATUS HAVING MULTIPLE
MAGNETOSTRICTIVE RODS STACKED IN PARALLEL
Original Filed Oct. 19, 1954 2 Sheets-Sheet 1

INVENTOR
GEORGE J. FOUNDAS
BY Elmer J. Gorn
ATTORNEY

INVENTOR
GEORGE J. FOUNDAS
BY Elmer J. Gorn
ATTORNEY

United States Patent Office 3,078,426
Patented Feb. 19, 1963

3,078,426
MAGNETOSTRICTIVE FILTER APPARATUS HAVING MULTIPLE MAGNETOSTRICTIVE RODS STACKED IN PARALLEL

George J. Foundas, Boston, Mass., assignor to Raytheon Company, a corporation of Delaware
Continuation of application Ser. No. 463,278, Oct. 19, 1954. This application Mar. 20, 1959, Ser. No. 800,896
2 Claims. (Cl. 333—71)

This is a continuation of my application, Serial No. 463,278, filed October 19, 1954, now abandoned.

This invention relates to radiant energy, and particularly to the division of radiant energy into multiple components distinguished, one from another, by the differences in their oscillating frequencies, that is, in the length of the waves constituting their respective propagation patterns.

The invention, in one of its aspects, resides in the provision of a novel method and means for dividing radiant energy into constituent parts according to frequency differences therebetween, the novel method including the step of adjusting a plurality of magnetostrictive elements to vibrate at progressively graduated frequencies, and the further step of utilizing said magnetostrictive elements as energy transfer agencies for selectively delivering to a corresponding plurality of energy pick-up circuits output voltages proportional to the diverse components of a received radiant energy frequency spectrum, which diverse frequency components produce correspondingly varying vibratory rates in said magnetostrictive elements; and the novel means including structural features of the magnetostrictive assembly.

In another of its aspects the invention resides in the provision of radiant energy dividing means in the form of a magnetostrictive filter having an energy converting coil or transducer adapted to select from a received frequency spectrum that energy component whose frequency of propagation corresponds to the vibratory rate of said magnetostrictive filter. In yet another of its aspects the invention resides in the structure, interrelationship, and mode of operation of the parts entering into the assembly constituting such magnetostrictive filter.

Other objects and characteristics of the invention will appear upon reading of the following description of the invention embodiment illustrated in the accompanying drawings wherein.

Figures 6, 7, 8, 9:
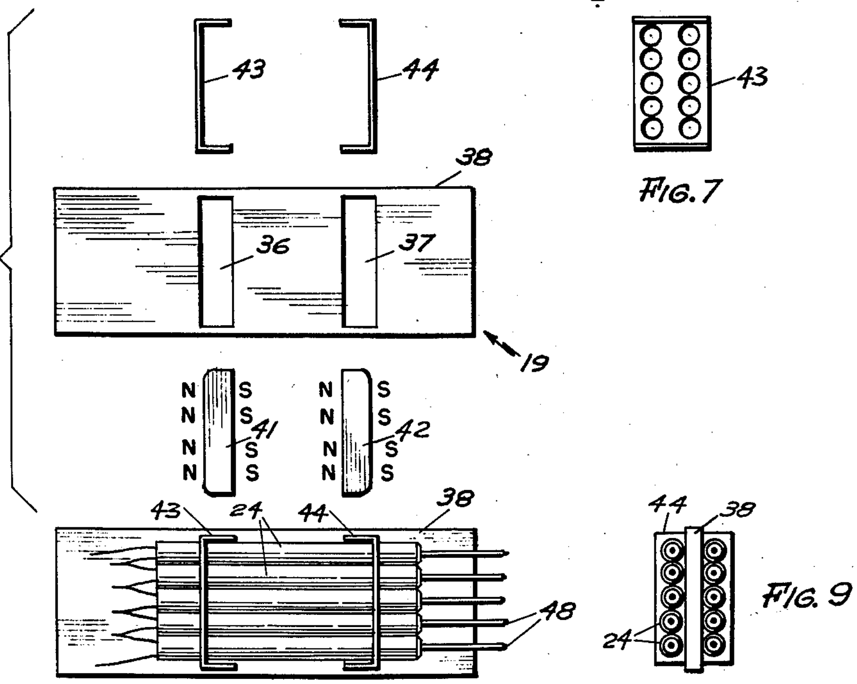
FIG. 6 is an exploded view of a filter pack for grouping into a single assembly a plurality of the individual filter units of the FIG. 5 design.
FIG. 7 is another view of one of the components of FIG. 6.
Figure 10:
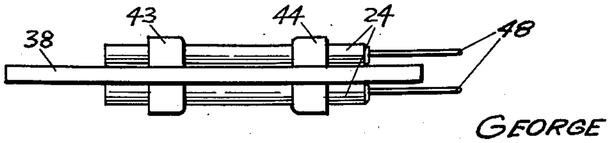

FIGS. 8, 9, and 10 are facial, end, and edge views, respectively, of the filter pack whose components are separately illustrated in FIGS. 3, 4, 5, and 6.

Figures 1, 2, 2A:
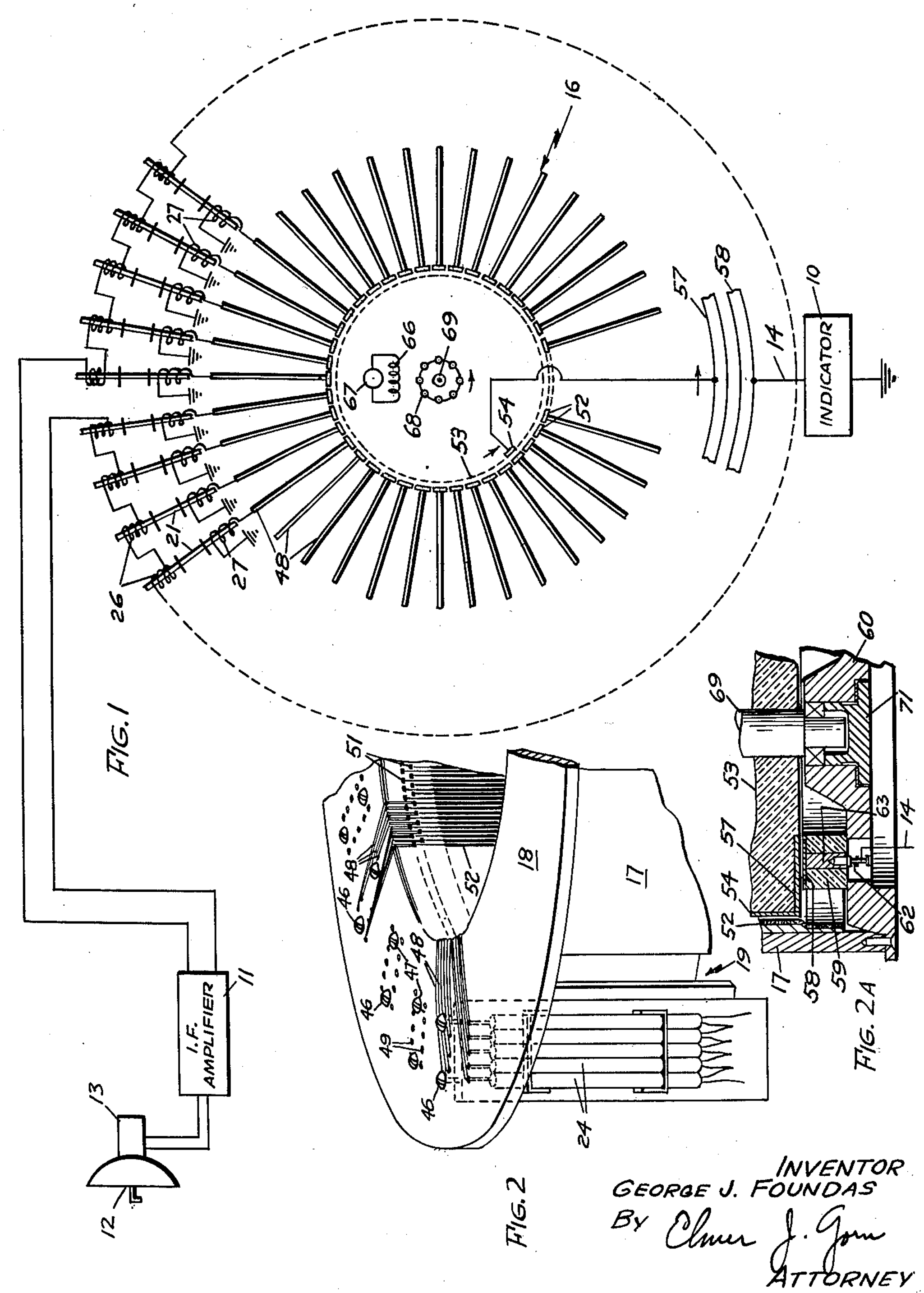
FIG. 1 is a diagram of electrical relationships and connections for applying the invention to the analysis of the frequency spectrum embracing a frequency band within which may be contained one or more signals to be detected and utilized.
FIG. 2 is a perspective view of a portion of the filtering and commutating assembly constituting part of the spectrum analyzing system indicated in FIG. 1.
FIG. 2A is a sectional view of a portion of the assembly of FIG. 2.

Referring first to FIGS. 1 and 2, these views illustrate a spectrum analyzing system including a unit 10 for indicating or utilizing the various frequencies characterizing the signal components contained within a frequency band embraced by and passed through the IF amplifier 11 associated with receiving antenna 12 and receiving circuitry 13. Indicator 10, or any equivalent utilization apparatus, is located in an actuating circuit 14 leading from a rotary type of capacitance commutation device 16 disposed centrally of an enclosing metallic shell 17 having an upper circular flange 18 of rigid insulating material sufficiently sturdy to support, in angularly spaced suspension from its under surface, a plurality of filter packs 19, each pack being of the construction indicated in FIGS. 6 to 10, inclusive, and each pack including, as shown, ten individual filter units having individually the composition indicated in FIGS. 3, 4, and 5.

Figures 3, 4, 5:
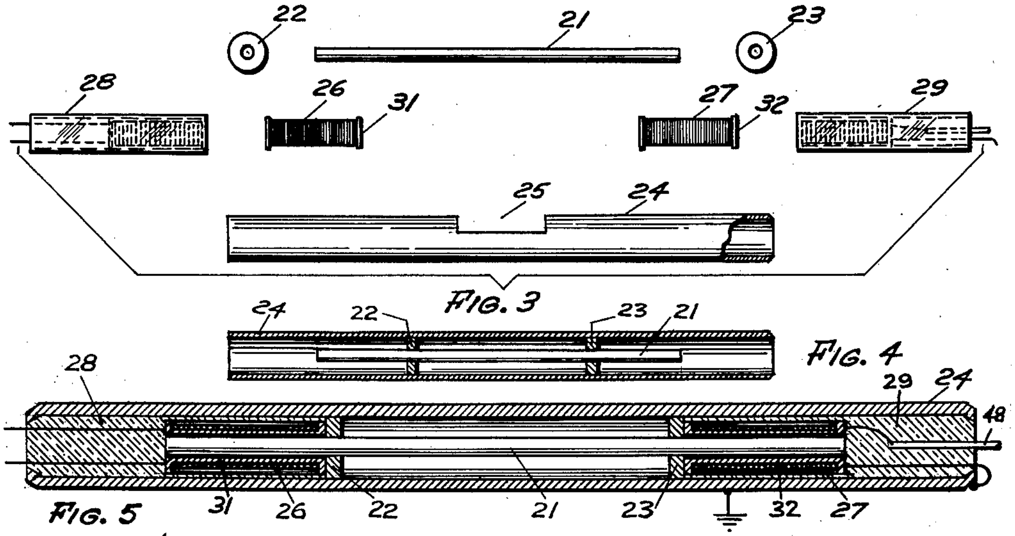
FIG. 3 is an exploded view of a magnetostrictive filtering unit embodying the invention.
FIGS. 4 and 5 are, respectively, partial and complete assembly views, in section, of the magnetostrictive filter unit of FIG. 3.

Referring now to FIGS. 3, 4, and 5, the filter shown is composed of a magnetostrictive rod 21, two nodal washers 22 and 23, a metallic case 24, an input transducer comprising a driving coil 26, and an output transducer comprising a pick-up coil 27, the coils 26 and 27 being wound alike, or differently, depending upon the voltage ratio desired. Both coils are "potted" in thermosetting resinous material, as indicated at 28 and 29, which material completely fills the end portions of the case 24. The rod 21 is composed of nickel-steel having the desired high frequency vibrational characteristics, for which purpose the alloy sold commercially as "Ni-Span-C" has been found to be quite satisfactory, although other magnetostrictive alloys capable of responding to magneto-motive force in the manner described herein may, of course, also be employed.

Before each case 24 is rigidly secured to the filter assembly 19 the magnetostrictive rod 21 for such case may be secured within said case in a manner permitting vibration with resonant frequency when the rod is subjected to an electromagnetic field applied thereto in the immediate region of one of the nodal points along the longitudinal axis of the rod. In order to facilitate vibration of the rod in coincidence with (by way of example) the second harmonic of its resonant frequency, the washers 22 and 23 should be secured to the rod at the one-quarter and three-quarter longitudinal dimensional divisions of the rod, assuming the rod to be of a length corresponding to a single wave length set up by the rod when vibrating at its resonant frequency. As indicated in the FIG. 4 assembly view, the washers 22 and 23 are permanently locked to the rod (as by staking or crimping) at the one-quarter and three-quarter longitudinal dividing points along the rod, so that the distance between the two washers constitutes one-half of the total length of the rod and corresponds to a one-half wavelength at the resonant frequency, while the portion of the rod adjacent the respective transducer windings 26 and 27 has a maximum dimension of one-quarter wavelength at the resonant frequency. By dimensioning washers 22 and 23 diametrically to fit snugly against the inner cylindrical surface of case 24, and by spacing the washer fixation points to correspond to one-half or other major divisional points of the wave pattern established by the rod when vibrating at some harmonic multiple of its resonant frequency, there is obtained an energy conversion device adapted to translate a particular control frequency applied to the transducer winding 26 into a high-frequency longitudinal vibration of the magnetostrictive rod 21, which vibration in turn causes the generation within the output winding 27 of an output current actuated by a voltage whose magnitude will be a precise measure of the said control frequency applied to the input winding 26. Moreover, as the resonant frequency is a function of rod length, rod density, hardness, heat treatment, and transverse dimensional uniformity, successively positioned filters of a single filter pack will have their rod components chosen to differ progressively, each from its predecessor in the series, by the relatively slight physical deviations which will cause successive rods to have resonant frequencies that progressively differ, on the average, approximately by the number of cycles preselected to be the band width dividing factor, that is, the factor $$\frac{F_2-F_1}{N}$$

wherein $F_2$ represents the upper limit of the selected band width, $F_1$ the lower limit, and N the product of the number of individual filters constituting a filter pack, multiplied by the number of filter packs assembled into a system (or subdivision thereof), such as the spectrum analyzing system shown in FIGS. 1 and 2. In quantity production, the inevitable differences in physical attributes, in the respects noted above, as between successively machined nickel-steel rods, will be sufficient to establish the desired gradation in resonant frequency characteristics, so that a complete spectrum analyzing combination can be assembled by the process of selecting from a quantity of rods of roughly equal physical constituency those individual specimens whose actual composition differs sufficiently to permit their being combined to establish the desired uniformly graded pattern of resonant frequency progression embracing the total frequency band width to be analyzed.

Having assembled in this manner a complete set of band width-spanning filter units, each unit may be finally adjusted within its individual case 24 (after the nodal washers 22 and 23 have been staked thereto at the one-quarter and three-quarter longitudinal dimensional points, respectively) by inserting into the case the washer-equipped rod, with its input and pick-up coil units assembled thereon, then "tailoring" the rod by drawing a file back and forth across its surface while it remains within the case 24, until there is achieved the precise lateral dimensioning which brings the longitudinal vibrational rate of the rod, when activated, to its resonant frequency. To permit this "tailoring" procedure, each case 24 may be apertured as illustrated at 25.

Before this resonance-achieving "tailoring" operation is performed, the person conducting the assembling operation will first establish a permanent locking of the assembly to the tubular case 24 by applying to the two open ends of the case a sufficient quantity of thermo-setting potting or cementing fluid to effect a firm retention of the transducer coils 26 and 27 and an adherence thereof to the inner surface of the tube 24 at opposite ends of said case. As a supplementary step for the same purpose, the tube ends may be rolled inwardly. By this procedure the rod assembly becomes permanently locked against endwise displacement with respect to the enclosing tubular case, while at the same time the rod ends remain free to vibrate within the cylindrical shanks of the spools 31 and 32 upon which the coils 26 and 27, respectively, are wound; it being understood that the inner diameters of said spool shanks are sufficiently larger than the diameter of rod 21 to permit such free vibration of the rod ends within said spool shanks.

The three basic requirements of an array of magnetostrictive filter units, as herein described, are first, stability of resonant frequency; second, stability of output voltage; and third, a predetermined gradated progression of frequency increments over the entire width of the received frequency band. The preceding paragraphs describe the procedure for assuring maintenance of resonant frequency stability. Output voltage stability may be assured by the following procedure:

First, form two rectangular slots 36 and 37 in the non-magnetic mounting plate 38 for each filter pack, as indicated in FIG. 5, where such slots are shown as located at regions coinciding with the axial locations assumed by the transducer coils 26 and 27 when the assembly is complete. As a second step, insert into these slots

36 and 37 the bar magnets 41 and 42 (FIG. 5) of "Alnico" or equivalent permanently magnetic material, to constitute the magnetic biasing means for permanent polarization of the transducers in the magnetic state best suited to the desired voltage pattern. As a third step, insert into the slots 36 and 37 a pair of holding racks 43 and 44 (FIGS. 6 and 7) into each of which has been pre-stamped a set of holes permitting reception of the cases 24 containing the individual filter units. Fourthly, each case 24 may then individually be moved back and forth along the racks 43 and 44 until there is established the precise axial position which produces the output voltage that has been precalculated as the voltage obtainable when the associated input coil 26 is receiving energy at the selected frequency.

As for the third of the three basic requirements listed above, namely, the requirement that there be a predetermined graduated progression of the frequency increments constituting the received frequency band, this requirement is met by arranging the individual filter units 24 of each filter pack 19, and the individual filter packs, in the exact sequence conforming to the order of progression of the frequencies to which each individual filter and each filter pack, have been calibrated. The successively positioned filter packs 19 are then secured in the proper order to the flange 18 by suitable screws passing through the flange and into the upper edge surface of each filter plate 38, as indicated at 46 and 47 in FIG. 2. The input leads of the coils 26 are interconnected to establish either a series or a parallel relationship, as desired, between any selected number of successive driving coils 26. In the wiring arrangement illustrated schematically in FIG. 1, the coils 26 are shown connected in series relationship, so that the entire energy input passes through all input transducers in series succession. However, as above noted, a parallel relationship, or a series-parallel relationship, may be substituted, depending upon the results desired.

In the illustrated application of the invention to circuit commutating means, as shown in FIGS. 1 and 2, one terminal of each pick-up coil 27 is grounded (as by connection to its grounded case 24), while the other terminal connects to an insulated lead 48 adapted to enter one of the eyelets 49 punched through the commutator flange 18 in locations having lateral alignment with the respective axes of the individual filter units, so that the said leads 48 may be readily passed through said openings 49 and then drawn over the upper surface of the flange 18, as illustrated in FIG. 2, then proceeding vertically downward for attachment to successively arranged terminal pins 51 spaced staggeredly in two horizontal rows about the inner periphery of the cylinder 17. These terminal pins 51 thus serve as the means for delivering the energy output of the filter unit pick-up coils to the vertically extending current conducting strips 52 formed by etching the inner surface of the cylinder 17, constituting the stationary portion of the capacitance commutator apparatus 16 whose cooperating rotatable element is shown partially at 53 in FIG. 2*a*, and also shown diagrammatically in FIG. 1. The complete construction of the capacitance commutator rotor 53 is illustrated and described in U.S. Patent application No. 417,757, filed by Nesbit L. Duncan et al. on March 22, 1954, which issued as U.S. Patent 2,760,127, August 21, 1956, and assigned to the assignee of this application. For present purposes it is sufficient to note (since the commutator, per se, is not a part of this invention) that the said rotor 53 is primarily composed of ceramic or other electrically non-conducting material but incorporates a single strip 54 of current conducting material extending along the full length of the rotor at one angular position about its cylindrical outer surface, the length of the strip 54 of conducting material being substantially that of the stationary conducting strips 52 so that rotation of the rotor 53 about an axis common to said rotor and to the cylinder 17 will cause said rotating strip 54 to move past each of the conducting strips 52 in succession and thereby establish a capacitance coupling relationship with each of said strips in succession, by reason of which capacitance coupling there will be effected progressive transfer to the capacitance strip 54 of electrical energy charges whose magnitude will be of varying proportions in accordance with the variations in the output voltages of the successively disposed filter units constituting the source of the energy picked up by the rotating strip 54. The picked-up energy is continuously passed along to the outgoing conductor 14 through intermediate connections illustrated as including a flat sheet 57 of conducting material applied uniformly over the lower surface of the rotor 53 and forming a capacitance coupling with an annular strip or sheet 58 of conducting material covering the upper surface of a non-conducting ring 59 resting upon the supporting base 60.

Base 60 is apertured to permit attachment of the conductor 14 to a terminal post 62 inserted into the central conducting core 63 of the ring 59, which core 63 is in electrical contact with the capacitance coupling strip 58 above referred to. Since the pick-up strip 54 of the rotor is in contact with the lower capacitance sheet 57, and since the latter maintains constant capacitive coupling with stationary capacitance element 58, it will be apparent that the electrical charges successively received from the filter units by the vertically disposed capacitance element 54 will be continuously transferred to the horizontally disposed capacitance element 58, and in this manner there will be delivered to the outgoing conductor 14 and hence to the grounded ultilization device 10 a series of electrical impulses of a magnitude that will vary, from impulse to impulse, in exact proportion to the variations in the voltage outputs of the successively commutated filter units arrayed about the periphery of the commutating apparatus as indicated in FIGS. 1 and 2. By reason of this operation it will be possible to obtain at the utilization point 10 a continuing indication (as for example upon a viewing screen, if the unit 10 is a cathode ray oscilloscope) of the variable content of that portion of the radiant energy spectrum which falls within the band width embraced by the frequency selection characteristics incorporated into the filter array.

Any suitable means may be employed for maintaining the rotor 53 in continuous rotation within the cylinder 17, but the means illustrated in the Duncan et al. application above identified, and reproduced schematically in FIG. 1, takes the form of an induction motor having stator windings 66 energizable from a suitable alternating current source 67, and a rotating magnet or inductor assembly 68 disposed about a central shaft 69 serving as the mechanical coupling between the inductor-rotor 68 and the capacitor-carrying non-conducting rotor 53. As indicated in FIG. 2A the lower end of the coupling shaft 69 may be reduced in diameter for reception within a bearing assembly 71 forming part of the lower support structure 60 of the apparatus and facilitating free rotation of the shaft 69 with its rotors 53 and 68.

It is to be understood, of course, that the magnetostrictive filter units illustrated in FIGS. 3, 4, and 5 may be used independently of the filter pack and magnetic biasing structures illustrated in FIGS. 6 to 10, inclusive. Alternatively, other packaging and magnetic biasing arrangements may be substituted. Thus, for example, a series of individual filter units such as those shown in FIGS. 3, 4, and 5 may be mounted in a circular array and a common magnetic biasing means applied thereto in the form of a magnetic field-producing winding encircling all of the grouped filter units, or otherwise disposed in common electromagnetic biasing relationship thereto. Again, such a circular array could have a common drive coil as its energy input means. It is likewise to be understood that either the individual filter units or the filter packages may be applied to circuitry and to electrical or electronic purposes other than those indicated in FIGS. 1 and 2. In applying the invention to such alternative electrical or electronic purposes, the individual voltage outputs of the individual filters or filter groups may be utilized separately or collectively. Thus all of the voltage outputs could be recombined to re-form the energy content of the input circuit into a single output circuit of corresponding characteristics except for the incorporation into such single output circuit of some special adaptability in the nature of an improvement upon the characteristics of the input circuit. Thus, for example, the filter array illustrated may be used as a band pass filter, wherein it may operate to facilitate the attainment of the ideal rectangular selectivity pattern that is desired for utilization of the circuit as a communication signal channel constituting one of a series of adjacent communication channels characterized by very close spacing of frequency bands, from channel to channel. In such an application of the invention the filter units illustrated in FIGS. 3 to 10, inclusive, would function in a manner analogous to the operation of a conventional LC filter network but would have the advantage of possessing considerably higher efficiency in the matter of avoiding the large loss factor inherent in most LC filter network arrangements, as well as in the matter of greater stability over wide temperature and frequency ranges. In this connection it is also to be understood that although the magnetostrictive energy conversion rod 21 is illustrated in FIG. 3 as being supported at its one-quarter and three-quarter longitudinal dimensional points, for vibration at the second harmonic of the resonance frequency, there are many situations wherein it may be more advantageous, depending upon the frequency and voltage gain specifications to be met, to support the rod for vibration in other harmonic patterns as, for example, the third or fourth harmonic of the control frequency, in which case the location and number of nodal support points may be other than as illustrated in FIGS. 4 and 5. It is accordingly to be understood that the invention is not limited to any of the particular constructions, combinations, applications, modes of operation, or relationships of parts illustrated and described, except to the extent indicated in the appended claims.

What is claimed is:

1. In magnetostrictive filter apparatus, a recessed mounting plate, a plurality of mounting racks, a plurality of magnetostrictive filter cases carried by said mounting racks, a filter unit supported concentrically within each of said cases, said cases having their longitudinal axes in parallelism and containing apertures adjacent the central portion thereof permitting a fine adjustment of said filter units to a predetermined resonant frequency, and magnetic biasing means comprising a bar magnet spanning said filter units and nested within the recessed portion of said mounting plate.

2. In magnetostrictive filter apparatus, a recessed mounting plate, a mounting means secured to said plate, a plurality of magnetostriction filter units carried in said mounting means, and a bar magnet positioned adjacent said filter units and having its longitudinal axis extending transversely of said filter units to exert a polarizing bias upon the magnetic fields established by said magnetostrictive filter units, wherein said bar magnet is nested within the recessed portion of said mounting plate.

References Cited in the file of this patent

UNITED STATES PATENTS

| | | |
|---|---|---|
| 1,997,599 | Pierce | Apr. 16, 1935 |
| 2,241,831 | Wahlquist | May 31, 1941 |
| 2,542,734 | Tucker | Feb. 20, 1951 |
| 2,552,139 | Bocciarelli | May 8, 1951 |
| 2,559,905 | Turner | July 10, 1951 |
| 2,631,193 | Roberts | Mar. 10, 1953 |
| 2,696,590 | Roberts | Dec. 7, 1954 |
| 2,774,035 | Richmond et al. | Dec. 11, 1956 |

(Other references on following page)

UNITED STATES PATENTS

| | | |
|---|---|---|
| 2,799,832 | Niederman et al. | July 16, 1957 |
| 2,803,800 | Vilbig | Aug. 20, 1957 |
| 2,825,808 | Doelz et al. | Mar. 4, 1958 |
| 2,846,654 | Epstein et al. | Aug. 5, 1958 |
| 2,888,652 | Niederman et al. | May 26, 1959 |
| 2,895,113 | Agar | July 14, 1959 |
| 2,905,909 | Niederman | Sept. 22, 1959 |
| 2,940,058 | Foster | June 7, 1960 |

FOREIGN PATENTS

| | | |
|---|---|---|
| 782,008 | Great Britain | Aug. 28, 1957 |